United States Patent [19]

Edwards et al.

[11] 4,246,940
[45] Jan. 27, 1981

[54] VENEER LATHE CHARGING APPARATUS AND METHOD FOR DETERMINING LOG SPIN AXIS

[75] Inventors: Paul O. Edwards, Sweet Home; William E. Bolton; Larry C. Hunter, both of Corvallis; Amos A. Horner, Cascadia, all of Oreg.

[73] Assignee: Applied Theory Associates, Inc., Corvallis, Oreg.

[21] Appl. No.: 925,521

[22] Filed: Jul. 17, 1978

Related U.S. Application Data

[63] Continuation-in-part of Ser. No. 772,010, Feb. 25, 1977, abandoned.

[51] Int. Cl.³ .......................... B27L 5/02; G01B 9/02
[52] U.S. Cl. ............................... 144/209 A; 82/45 S; 250/560; 356/386; 144/325
[58] Field of Search ............... 144/209 R, 209 A, 325, 144/323; 250/560, 563; 356/386, 387, 384, 324; 82/2.5, 45

[56] References Cited

U.S. PATENT DOCUMENTS

| 3,037,538 | 6/1962 | Graham | 144/209 A |
|---|---|---|---|
| 3,746,065 | 7/1973 | Mason | 144/209 A |
| 3,752,201 | 8/1973 | Heth | 144/209 A |
| 3,806,253 | 4/1974 | Denton | 144/209 A |
| 3,852,579 | 12/1974 | Sohn et al. | 144/309 R |
| 4,139,035 | 2/1979 | Bystedt et al. | 144/209 A |
| 4,197,888 | 4/1980 | McGee et al. | 144/209 A |

Primary Examiner—W. Donald Bray
Attorney, Agent, or Firm—Kolisch, Hartwell & Dickinson

[57] ABSTRACT

A veneer lathe charging apparatus includes a break-beam scanning system and a computer for determining an optimal log spin axis. The charging apparatus further includes charger arms independently operable and adjustable to transfer a log from a scanning station to a veneer lathe so that a predetermined spin axis is precisely alighed in the chucks of a veneer lathe. Additionally, there is provided an extendible-retractable spindle assembly operable for rotating a log during scanning.

9 Claims, 13 Drawing Figures

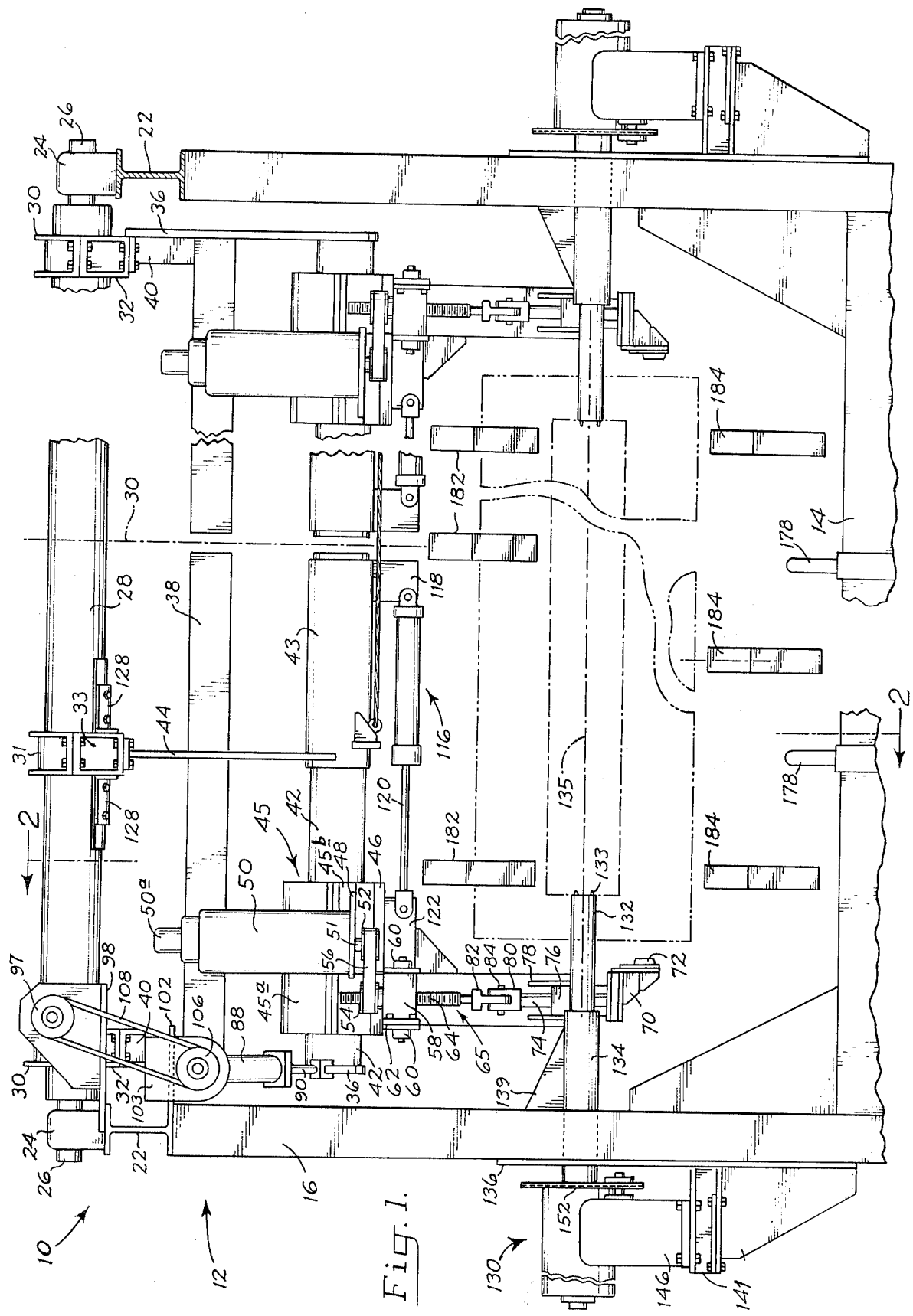

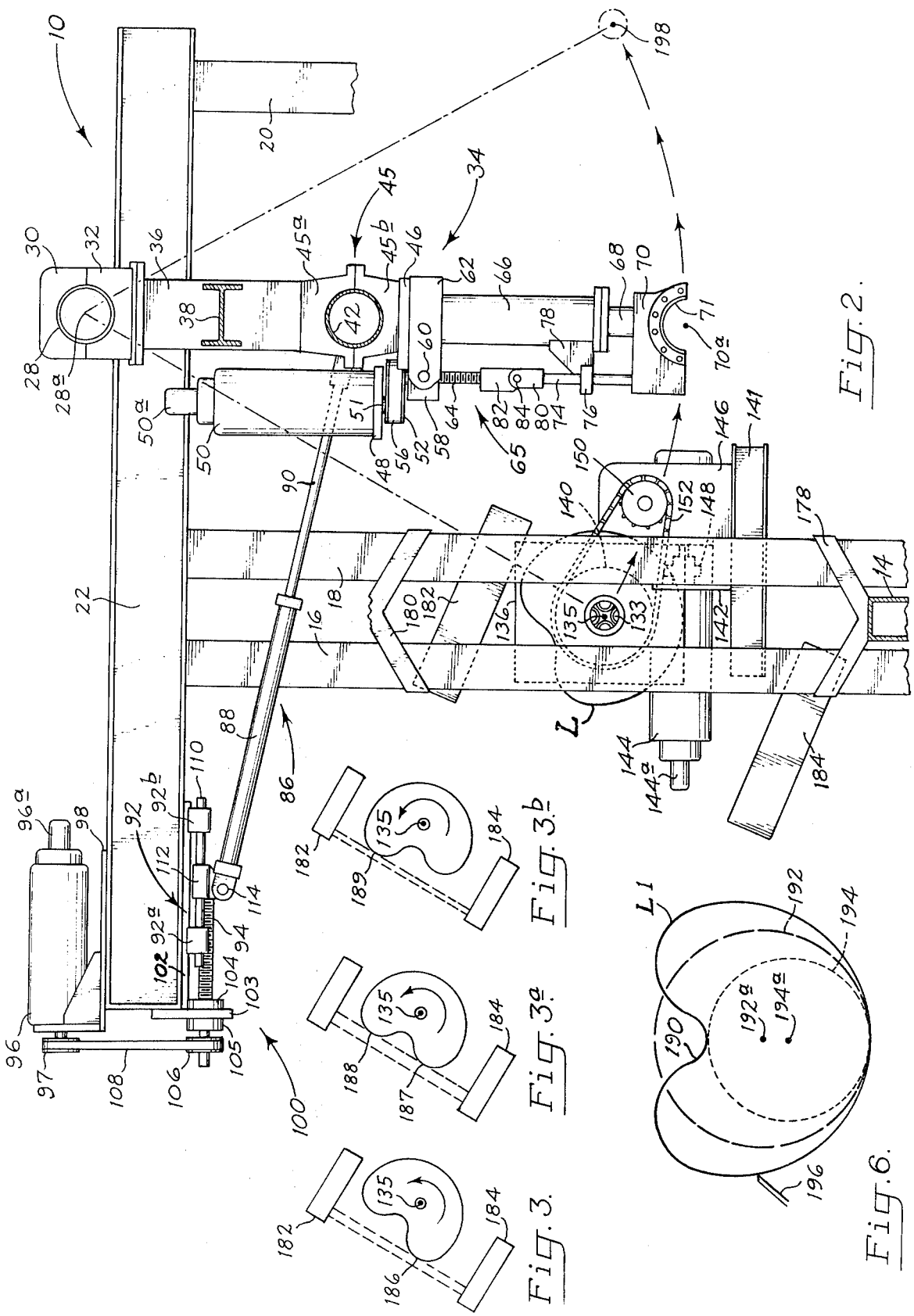

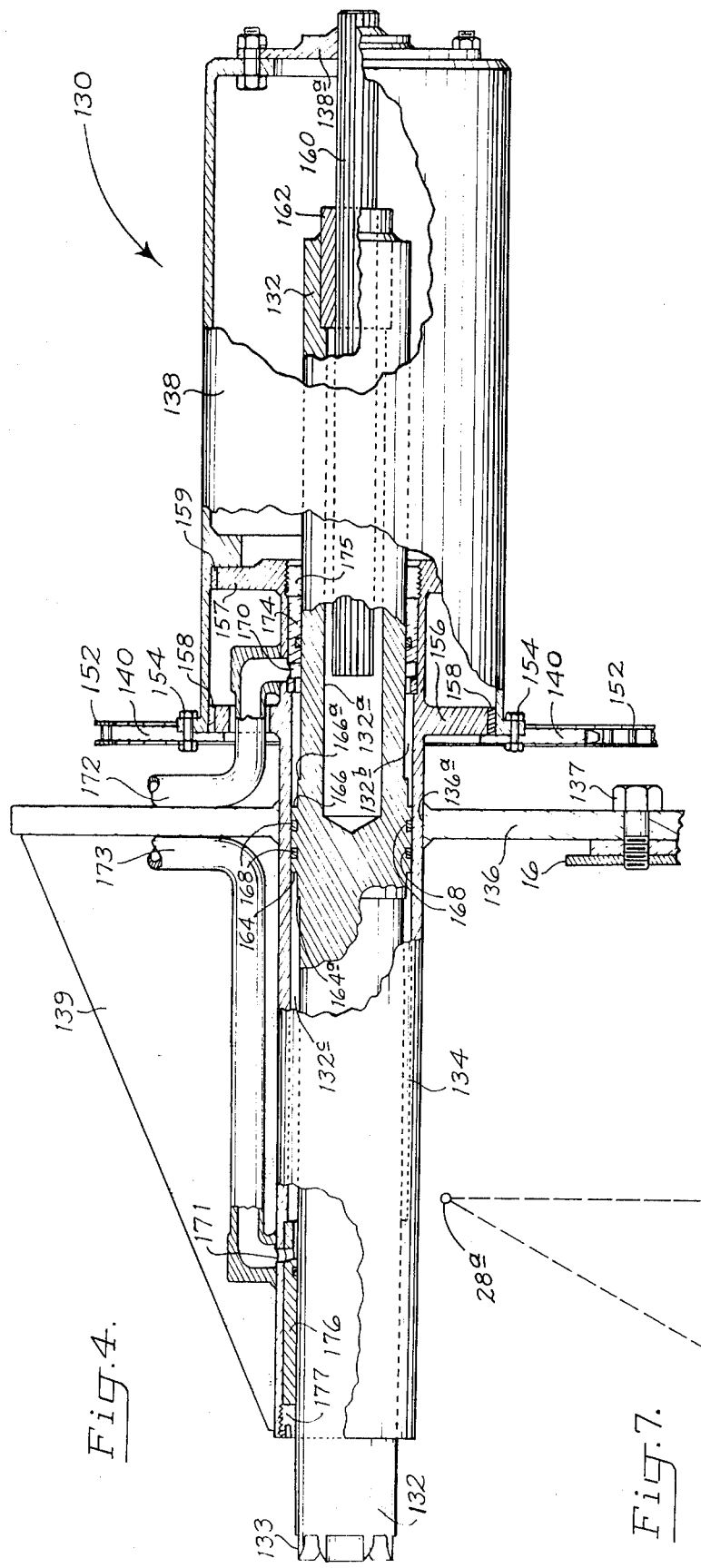
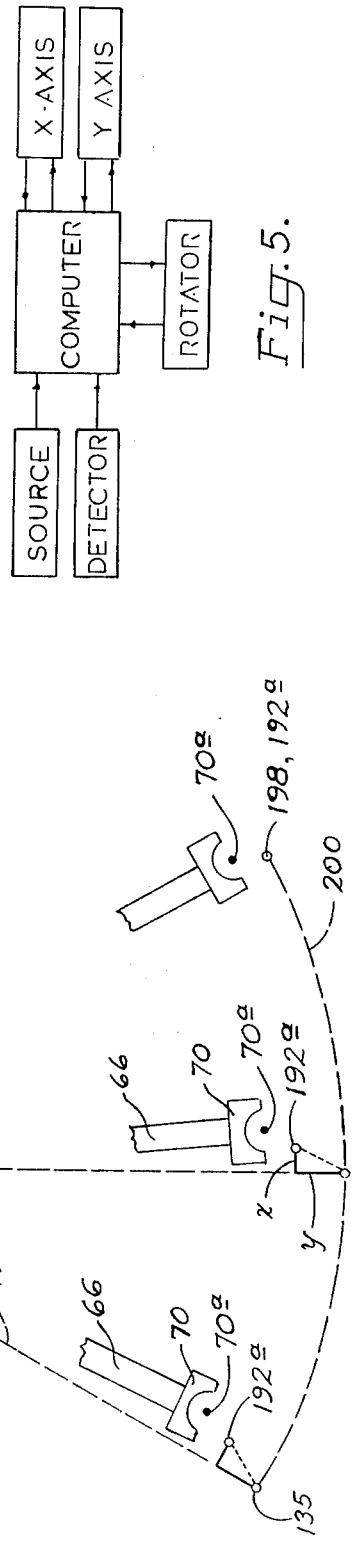
Fig. 4.
Fig. 5.
Fig. 7.

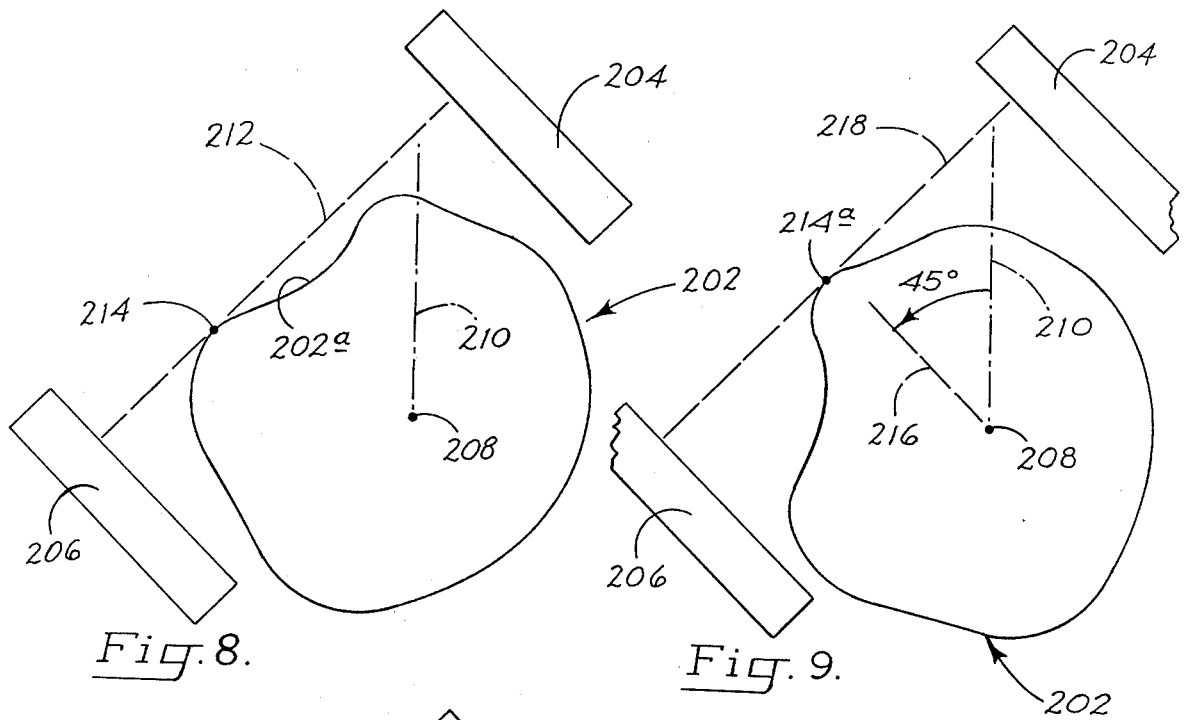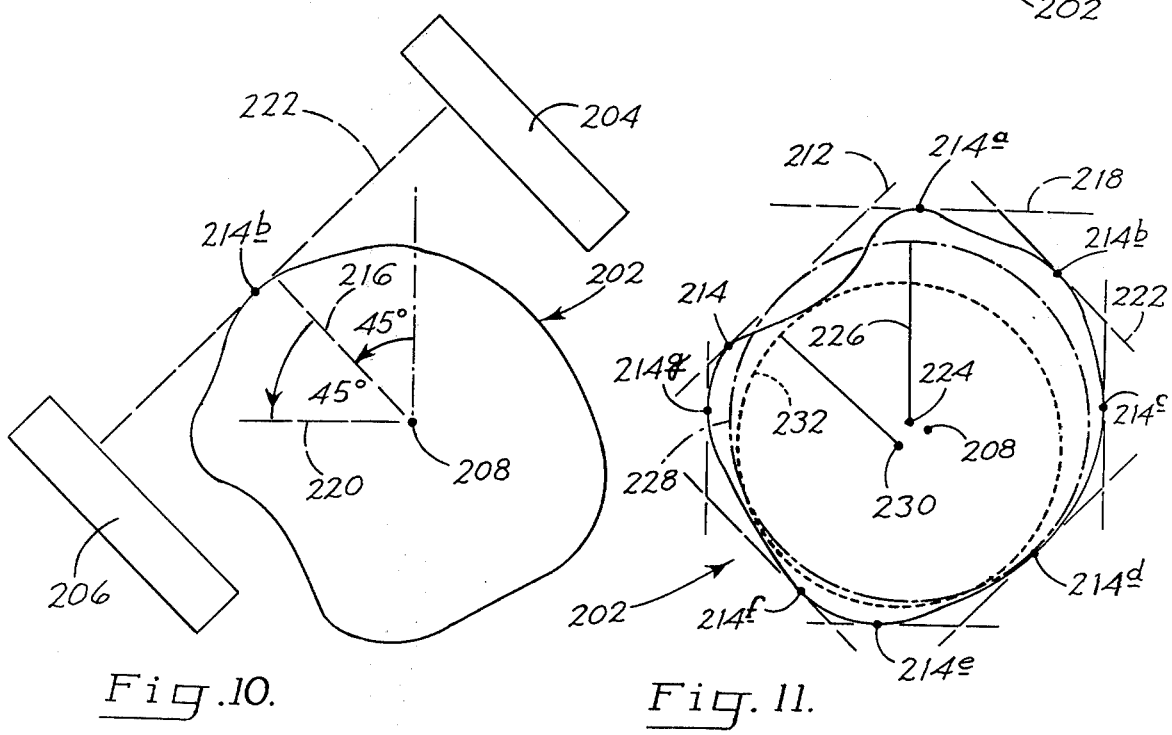

VENEER LATHE CHARGING APPARATUS AND METHOD FOR DETERMINING LOG SPIN AXIS

This application is a continuation-in-part of applicant's U.S. application serial No. 772,010, filed Feb. 25, 1977, now abandoned.

BACKGROUND AND SUMMARY OF THE INVENTION

The present invention relates to so-called veneer lathe charging apparatus employed to load a log onto a veneer lathe for peeling. More particularly, the present invention pertains to a charging apparatus including an electro-optical scanning system coupled to a computer for determining an optimum spin axis. Charger arms on the apparatus are selectively adjustable to transfer the log so that its spin axis is aligned in the chucks of the lathe.

Known veneer lathe charging apparatus typically take the form of an upright frame structure having spaced apart charger arms which are pivotally connected at the top of the structure. A log to be peeled is fed into the structure in a direction with its longitudinal axis generally perpendicular to the direction of travel. The log is deposited on yokes or so-called V's. Disposed above the V's are inverted V's. Both sets of V's are interconnected by a mechanism which simultaneously displaces the V's toward each other at an equal rate. Thus, the log is moved to a position whereby an axis approximating its center is maintained between the V's. The V's will always contact the log equidistant from a predetermined axis, which axis becomes the spin axis.

At this point, the charger arms are angularly displaced from a pre-spot position so that the log is gripped at its opposite ends. The V's are then simultaneously retracted, and the charger arms are pivoted toward the veneer lathe. The log is thereby transferred into the lathe in a position wherein the approximate log center or spin axis is aligned within the chucks on the veneer lathe. The chucks are then actuated to grip the log about the spin axis. The log is then rotated and veneer is peeled therefrom.

There are several significant disadvantages with the above-described apparatus. First of all, it can be readily appreciated that because logs do not have a uniformly round profile, the V's simply cannot accurately determine the longitudinal axis or optimum spin axis of a log. Therefore, when the log is transferred to the veneer lathe, and the chucks are extended to grip the log and rotate same, the log will not be rotated about its optimum spin axis. As a result, precession will occur during peeling of veneer, which decreases the usable amount of veneer peeled from the log.

Because of the nation's dwindling timber resources, and because it is economically unfeasible to waste material during veneer peeling, there have been proposals directed to more accurately determining the optimum spin axis of a log. Prior art proposals have defined the optimum spin axis as being the axis of the largest right cylinder found within the volume of a log. In order to accurately located such a spin axis, it has been proposed to determine the surface configuration of a log prior to its peeling into veneer. Once the surface configuration has been determined, it is a simple matter to calculate the sought for right cylinder. Systems have been proposed for determining the surface configuration using light radiation sources for transmitting light to the log's surface and measuring the time for the reflected light to return to a transceiver. The log is rotated and the measurements are taken for different angular displacements through 360°. The surface configuration of a log is thereby determined.

A problem present with the light radiating and reflection system resides in the fact that a log will often have concave surfaces. Thus, when light is directed toward the log it will travel to an innermost portion of a concave surface before it is reflected back to the transceiver. Consequently, if there are plural concave regions, the right cylinder computed will lie inwardly of such regions. Thus, as the log is rotated about the computed spin axis in a veneer lathe (corresponding to the longitudinal axis of the right cylinder), small strips of veneer will be peeled from the log adjacent to the concave portions. Optimum veneer yield will not be obtained.

Additionally, once the optimum spin axis according to the above-described system has been determined, it is also difficult to accurately transfer the log from its scanning position so that the spin axis is accurately aligned with the chucks of a veneer lathe. The spin axis intersects the ends of the log at different points offset from the axis used during scanning.

Accordingly, it is a general object of the present invention to provide a charging apparatus which will accurately determine an optimum spin axis not necessarily defined by the axis of the largest right cylinder included within the volume of a log. To provide such an apparatus, the present invention uses an electro-optical "break beam" scanning system in which the log is rotated through light beams being emitted from sources to detectors. Such a system will not determine the surface configuration of a rotating log based upon interior regions of concave portions of the log. A computer receives data transmitted from the sources and detectors and calculates the optimum log spin axis which may include a cylinder lying partially outside the surface configuration or periphery of the log.

Another object of the present invention is to provide a charging apparatus in which each of the charger arms is operable independently from one another and is adjustable for precisely positioning a predetermined log spin axis in alignment with the chucks of a veneer lathe. Each arm is provided with a log gripping means or shoe which can be selectively extended or retracted to vary the length of the arm from the arm's pivot axis to a point defined by the shoe. Additionally, each arm is pivotally moved by a fluid actuated cylinder, which cylinder is selectively shiftable along the horizontal.

Another object of the present invention is to provide a scanning system in which an extendible-retractable spindle grips and rotates the log during a scanning operation.

These and other objects and attendant advantages of the present invention will be more readily understood from a consideration of the drawings and the detailed description which follow.

BRIEF DESCRIPTION OF THE DRAWINGS

FIG. 1 is a front view of a charging apparatus, broken along its width and modified according to the principles of the present invention;

FIG. 2 is a view taken along lines 2—2 of FIG. 1 and illustrates pivotal movement of a charger arm;

FIGS. 3, 3a and 3b are schematic views of a log rotating sequence according to the present invention in which peripheral points on the log's surface break a light beam being emitted from a source to a detector, only a single source and detector being illustrated;

FIG. 4 is an enlarged view, partially broken away, illustrating details of an extendible-contractable auxiliary spindle used to grip and rotate a log during a scanning operation;

FIG. 5 is a block diagram of the scanning system along with a charger arm adjusting system operable in conjunction with a computer according to the present invention;

FIG. 6 is a view of a so-called heat-shaped log and illustrates an optimum spin axis according to the present invention in comparison with the optimum spin axis as defined by the largest right cylinder includable in the volume of the log;

FIG. 7 is a shcematic view of the steps required to selectively adjust the orientation of a charger arm in order to align a predetermined spin axis in the chucks of a veneer lathe;

FIG. 8 is a schematic view, similar to that shown in FIG. 3, of a typical log profile, taken in cross-section, during rotation about a scanning axis between a source and detector;

FIG. 9 is a view similar to FIG. 8 illustrating rotation of the log about the scanning axis a first predetermined angular distance;

FIG. 10 is another view of the log in FIGS. 8 and 9 wherein rotation has occurred for a second predetermined distance; and FIG. 11 is a schematic view of the same log shown in FIGS. 8–10 illustrating construction of an irregular polygon based on tangent lines to convex peripheral points of the cross-section.

DETAILED DESCRIPTION OF THE INVENTION

The present invention provides a veneer lathe charging apparatus which is operable to rotate a log through 360°, and by using a break-beam scanning system and a computer, determine a log spin axis in which optimum veneer yield is ensured. The charging apparatus includes charger arms which are independently adjustable to grip a log and transfer it from a scanning station to a veneer lathe so that the spin axis is aligned in the chucks of the lathe. With this brief overview in mind, details of the construction and operation of the present invention will now be set forth.

Turning to FIGS. 1 and 2 of the drawings, there is indicated generally at 10 a charging apparatus in accordance with the present invention. Apparatus 10 includes a supporting frame structure generally designated at 12. Structure 12 includes upright members 16, 18, 20 which are arranged at opposite ends of lower horizontal supporting members (not shown). I-beams 22 interconnect members 16, 18, 20. Mounted on top of beams 22 are bearings 24 through which a shaft 26 is rotatably mounted. Shaft 26 includes an enlarged portion 28 extending between bearings 24.

Apparatus 10 is symmetrical about a center line 30 indicated in FIG. 1. The right hand side of FIG. 1 has been partially broken away to conserve space. Further, FIG. 1 does not include several elements shown in the left-hand side of the figure for purposes of illustrating structure which would normally be hidden. FIG. 2 is a view taken along lines 2—2 of FIG. 1 and illustrates essential features of the present invention. A description of these features will be described with reference to the view shown in FIG. 2, but it must be remembered that the right hand side of apparatus 10, as viewed in FIG. 1 is substantially identical.

Opposed bearing halves 30, 32, are connected together around shaft 28. Connected to an underside of bearing 32 is an elongate charger arm generally designated at 34. Arm 34 includes a plate member 36 connected to bearing half 32. Extending inwardly from member 36 is a beam 38 connected to member 36 and a support bracket 40.

Connected adjacent the bottom of plate 36 is a laterally extending tube member 42. A supporting bracket 44 interconnects beam 38 and tube 42 and depends from additional bearing halves 31 and 33. A bottom portion of bracket 44 is connected to a mount 43. A slide mount 45 constructed of two halves, 45a and 45b, is slidably mounted on tube 42. A plate 46 is connected to mount 45 and supports a mounting plate 48. Mounted on top of plate 48 is an electric motor 50. A drive shaft 51 extends through an aperture in mounting plate 48 and is connected to a drive pulley 52. A shaft encoder 50a is provided for indicating the amount of rotation of shaft 51. Pulley 52 is operatively connected to another pulley 54 by means of a timing belt 56. Pulley 56 is mounted on a trunnion 58 which includes pin members 60 supported in an apertured bracket 62.

Rotatably mounted and supported within trunnion 58 and rigidly connected to pulley 54 is a nut (not shown) which, with a screw 64, forms a power transmission means of the so-called ball bearing screw type, generally indicated at 65. Screw 64 is formed with concave helical grooves. Cooperating helical grooves are provided in the nut and ball bearings and interposed the grooves. Thus, when pulley 54 is driven, screw 64 will move vertically upwardly or downwardly depending upon the direction of rotation. Screw 64 is nonrotatable and is driven by the rotating nut which is connected to pulley 54.

A guide means or tube 66 extends from plate 46 and slidably receives a rod 68. Connected to the bottom of rod 68 is a gripping means or shoe 70 formed with a semi-circular portion 71. Shoe 70 includes spikes or dogs 72 bolted thereto. Connected to shoe 70 is a rod 74 which is slidably disposed within a bushing 76. Bushing 76 is mounted to tube 66 by means of a bracket 78. A connecting link 80 is connected to a rod eye 82 at a pivot connection 84. Screw 64 has a lower end rigidly secured to rod eye 82.

As motor 50 is operated to drive pulleys 52, 54, it can be seen that screw 64 will move vertically upwardly or downwardly depending upon the direction of rotation. Accordingly, rod 74 will be moved to thereby slide rod 68 in guide means 66. As shown in FIG. 2, semi-circular portion 71 defines a center or reference point 70a which is located on a radial line extending from pivot axis 28a through charger arm 34. Thus, reference point 70a may be moved relative to arm 34 and pivot axis 28a by movement of rod 68.

Referring more particularly now to FIG. 2, it can be seen that arm 34 may be pivoted about shaft 28 and axis 28a by an actuating means or swing assembly generally designated at 86. Actuating means 86 includes a fluid actuated cylinder 88 having mounted therewithin an extendible-retractable rod 90. Rod 90 is fixed at its extended end to plate 36 in convenient manner. Cylinder 88 is mounted to frame structure 12 so that an end of the cylinder may be translated substantially horizontally along a slide mechanism generally designated at 92. Slide mechanism 92 is operated by a ball bearing screw 94 driven by a motor 96. Motor 96 is provided with a shaft encoder 96a and is mounted on a plate 98 which plate is in turn secured to beam 22. A power transmission means, generally designated at 100 is mounted to beam 22 by means of supporting plates, 102 and 103.

Power transmission means 100 includes screw 94 which is inserted through an aperture in plate 103 and further includes housing sections 104, and 105. Housing section 104 is rigidly connected to plate 103 and includes therewithin a rotatable nut (not shown). Pulley 106 is rigidly connected to the nut so that upon rotation of pulley 106, the nut will also rotate within housing 104 to drive screw 94. A belt 108 interconnects a pulley 97 of motor 96 with pulley 106. Slider mechanism 92 includes guides 92a, 92b connected to plate 102. A rod 110 is slidably disposed through guides 92a, 92b. More than one rod may be used to facilitate movement and prevent binding. An end of cylinder 88 is pivotally connected at 114 to bracket 112. Bracket 112 is rigidly connected to rod 110 and screw 94 has an end rigidly connected to bracket 112. Thus, it can be appreciated that upon actuation of motor 96, screw 94 will be horizontally moved to the right or left as viewed in FIG. 2. Upon such movement, slide mechanism 92 will guide an end of cylinder 88 in a horizontal direction. This motion will be transferred to the end of rod 90.

Returning to FIG. 1, it can be seen that another fluid actuated cylinder, generally designated at 116, is mounted by means of a bracket 118 to mount 43 and tube 42. An extendible-retractable rod 120 is connected to a plate 122 which in turn is connected to arm 34. Thus, upon extension or retraction of rod 120, charger arm 34 will be shifted laterally along tube 42 to either the left or right as shown in FIG. 1. Such a movement is necessary in order to grip a log, as will be described later.

Bearing assemblies such as halves 31, 33 and bracket 44 provide additional support for interconnecting beam 38 and tube 42. Thrust shoes are indicated at 128.

While a charger arm 34 and an actuating means 86 have been described with reference to the left of FIG. 1, it must be appreciated that the same structure is provided on the right-hand side of apparatus 10. Because the components are substantially identical, a repetitive discussion is deemed to be unnecessary.

Details of an assembly for rotating a log and scanning the log's surface configuration will now be described. With reference now directed to FIG. 4 as well as FIGS. 1 and 2, it can be seen that an auxiliary spindle assembly, or rotator means, generally designated at 130, includes an elongate spindle 132 which is rotatably and slidably disposed within an elongate cylinder 134. Spindle 132 includes dogs 133 at an outward end. Cylinder 134 extends through an apertured mounting plate 136. Plate 136 is mounted to the upright frame members. A casing or drum 138, includes a sprocket wheel 140 rigidly connected thereto. Casing 138 is rotatably mounted on cylinder 134 for rotation along a longitudinal axis concentric relative to the cylinder's longitudinal axis. Further details of spindle assembly 130 will be provided at a later point.

A mounting bracket 141 extends from a side of frame strcuture 12 and includes an upright motor mount 142. A motor, 144, is mounted on plate 142 so that a motor shaft extends through an aperture in the plate. A shaft encoder is shown at 144a. A gear reducer 146 is operatively coupled to motor 144 by means of a coupling 148. An output sprocket wheel 150 is operatively connected to sprocket wheel 140 by means of a chain drive 152. Thus, it can be appreciated that upon actuation of motor 144, sprocket wheel 140 is driven to rotate spindle 132. However, as previously mentioned, spindle 132 is also extendible and retractable within cylinder 134.

With reference now directed to FIG. 4, further details of auxiliary spindle assembly 130 will be particularly described. Cylinder 134 is rigidly connected to mounting plate 136 as described previously. Mounting plate 136 is connected to frame members such as frame member 16 by appropriate securing bolts, one of which is shown at 137. A bracket 139 supports cylinder 134 and is connected to plate 136. Cylinder 134 extends through an aperture 136a in mounting plate 136. Casing 138 is cylindrical in configuration and is connected to sprocket wheel 140 by circumferentially disposed bolts 154. An outer, stationary rim or hub 156 extends cylinder 134 and includes a bearing 158 for permitting cylinder 138 to rotate about rim 156. Another hub-bearing assembly is indicated at 157, 159. Spindle 132 is provided with an elongate bore 132a extending from the right-hand end of spindle 132 to an intermediate point. Extending through bore 132a is a splined shaft 160 which is rigidly secured to an end 138a of casing 138. Multiple keys 162 rigidly connected to spindle 132 slidably fit in splines in shaft 160 and permit spindle 132 to move in a direction along the longitudinal axis of shaft 160 but prevent relative rotation therebetween.

Spindle 132 also includes opposed piston surfaces 164, 164a, 166, 166a. Appropriate O ring seals 168 are interposed between the piston surfaces. A fluid conducting inlet port 170 communicates with a conduit 172 and permits fluid to be introduced into a chamber 132b between the outer diameter of spindle 132 and the inner diameter of cylinder 134. Another inlet port 171 permits fluid to be introduced into chamber 132c from conduit 173. Guides 174, 176 are provided for mounting spindle 132 in cylinder 134. Appropriate threaded connectors such as spanner screws 175, 177, maintain the guides in appropriate position.

Briefly, the extendible-retractable and rotatable spindle is operable as follows. A suitable fluid valving arrangement (not shown) permits actuating fluid to be selectively introduced and discharged through conduits 172, 173. With spindle 132 primarily retracted, as shown in FIG. 4, an introduction of fluid in conduit 172 and port 170 into chamber 132b will result in fluid pressure acting against piston surfaces 166, 166a. Spindle 132 will be extended to the left. Similarly, actuating fluid introduced through conduit 173 and port 171 will enter chamber 132c and act against piston surfaces 164, 164a to retract spindle 132 within cylinder 134 or to the right as shown in FIG. 4. During such retraction, fluid previously in chamber 132b is exhausted through port 170 and through conduit 172.

It is to be noted that spindle 132 is also rotatable about its longitudinal axis. Rotation is effectuated by casing 138 which is rigidly connected to sprocket wheel 140. Upon sprocket wheel 140 being rotatably driven, shaft 160, connected to spindle 132, also rotates thereby rotating spindle 132.

With reference now redirected to FIGS. 1 and 2, additional structural features will be described. Lower yokes or V members 178 are vertically opposed from upper V members 180. Such V members are known in charging apparatus, and are only schematically illustrated. Bottom V members 178 are arranged to receive a log from an infeed system, (not shown) to the left of FIG. 2. V members 178, 180 are interconnected by an elevator system (a portion shown at 14) which is operable for displacing the V members at equal rates toward each other. Thus, it can be seen that when a log is loaded on V members 178 and the V members are vertically displaced toward each other, the log will be elevated to an eventual position in which an approximate longitudinal center is reached. This center will never vary and is independent of log diameter. By design, this center will coincide with the longitudinal axis of the spindles. As shown in FIG. 2, the longitudinal axis of spindle 132, which corresponds to the longitudinal axis or center provided by the V's, is indicated at 135.

An electro-optical scanning system is provided for determining the surface configuration of a log. The scanning system is operable after a log has been located in V members 178, 180 and is moved to a position whereby the spindles are extended inwardly to grip the log as shown in FIG. 1. As shown diagramatically in FIGS. 3, 3a and 3b, and schematically in FIGS. 1 and 2, the scanning system includes plural scanning means located at predetermined locations along the length of the log. Each scanning means includes a source 182 and a detector 184 arranged so that high-frequency bursts of modulated, near infrared light are pulsed from source 182 to detector 184. Examples of such scanners are Optimux Series 200 manufactured by Opcon, Inc.

The scanning means are provided to measure the distance from longitudinal axis 135 to the peripheral point on the log which "breaks" a scanning beam during rotation of the log. The sources and detectors are arranged so that data signals are fed into a computer.

As shown in FIG. 5, in functional block diagram form, a computer is operatively interconnected to the sources and detectors. Shaft encoders 50a, 96a and 144a also are coupled to the computer and generate data signals indicating the amount of shaft rotation of motors 50, 96 and 144. From this data, the computer can determine the position of reference point 70a relative to axis 28a as well as the position of the end of cylinder 88 along slide rod 110.

For purposes of clarity, motor 96 coupled with power transmission means 100 and slide mechanism 92 can be thought of as a so-called X-axis actuator. similarly, motor 50 coupled with power transmission meas 65 and rod 68 is referred to as a Y-axis actuator. The computer is programmed to always know the positions of the actuators and is also operable to generate signals for selectively shifting the orientation of the actuators.

OPERATION OF THE SYSTEM

In order to prepare a log for optimum peeling on a veneer lathe according to the principles of the present invention, the log is initially fed onto V members 178. Charger arms 134 are disposed in a substantially vertical or pre-spot position as shown in FIG. 2, and spindles 132 are retracted. V members 178, 180 are then displaced toward each other so that V member 180 contacts an upper surface of the log. An approximate longitudinal center of the log is thereby defined by an axis extending through spindles 132 and represented by line 135. Spindles 132 are then extended so that dogs 133 grip the log. at its opposite ends. As shown in FIG. 1, spindles 132 are engaged with a log, shown in dot-dash. A larger log is also illustrated merely to demonstrate that the system can accommodate various sized logs. The log is now ready to be rotated through the scanning system.

Encoders 134a on motors 144 feed a data signal into the computer indicating the relative position of a preselected point on spindles 132. The spindles are then driven by motors 144 so that the log is correspondingly rotated through 360°. The encoders 134a are calibrated to indicate to the computer when rotation of predetermined arcs (for example, 15°) have been completed. Correspondingly, the source and detectors are operatively connected to the computer to indicate the distance from center 135 to a peripheral point during each 15° rotation which "breaks" a beam between the source and detector. In this way, the computer receives information concerning the peripheral or surface configuration of a log based upon the distance from axis 135 to outer beam-breaking points. It is to be noted that FIGS. 1 and 2 indicate a scanning system utilizing three source-detector pairs, but the number used will be determined by the accuracy desired for computing an optimum spin axis.

With reference now directed to FIGS. 3, 3a and 3b, an important feature of the present invention is to be noted. These figures illustrate one end, or a section of a log L, as the log is rotated through a portion of a scanning sequence. As shown in FIG. 3, as log L is rotated about axis 135, a peripheral point 186 will break a scanning beam at the end of a particular 15° rotation. However, as can be seen from a consideration of FIG. 3a, other points 187, 188 will also break another beam after another arc of rotation. The deepest concave part of log L will never be presented to face a beam. As shown in FIG. 3b, point 189 breaks a beam during another segment of the rotation. The result of this construction is that a surface configuration based on outer peripheral points rather than interior concave points will be developed. This information is then fed to the computer which determines a so-called optimum spin axis. The spin axis is the axis of a cylinder which will be included in the volume defined by the aforementioned non-concave pripheral points.

The importance of determining a spin axis based upon an outer periphery can best be appreciated by considering FIG. 6. A heart-shaped log L1 is illustrated having a concave region 190. The scanning system just described will provide the computer with data from which a cylinder having an outer circumference represented by 192 will be calculated. A spin axis 192a represents the longitudinal axis of such a cylinder. This is to be contrasted from the previously mentioned reflector scanning system which would take into account even the deepest regions of concave portion 190. Such a system would compute a cylinder 194 and a spin axis 194a. Circumference 194 is defined by the largest diameter which can be included within the peripheral boundary of log L1.

Assuming that spin axis 194a is placed in the chucks of a veneer lathe, it can be seen that a veneer knife, schematically represented at 196, will initially peel small strips from log L1 until it reaches the circumference 194. Thereupon, longer, full length sheets will be peeled. However, if spin axis 192a were placed in the chucks of a veneer lathe, knife 196 would also initially peel small strips of veneer but would soon contact circumference 192 so as to peel off relatively long veneer sheets. While such sheets would not be continuous due to concave portion 190, such sheets would still be considerably longer and more usable than the small strips which would be peeled off if spin axis 194a were used.

Thus, using spin axis 192a, it can be seen that relatively long sheets can be peeled from log L1 until the log is reduced in dimensions such that knife 196 can start to peel full length sheets. The non-full length sheets find utility as core material in plywood. It has been determined that the yield of usable veneer material utilizing a circumference developed as indicated by 192 with spin axis 192a will produce more usable veneer than an internal circumference such as represented by spin axis 194a. Thus, it can be appreciated that greater utilization of log material results.

It is to be noted that spin axis 192a, calculated as described above, will be offset from approximate axis 135. Points on either end of the log representing spin axis 192a will be offset differently from approximate axis 135. Thus, it is important, for reasons to be hereinafter described, that charging arms 34 be independently operable for proper placement of a computed spin axis in the veneer lathe.

After spin axis 192a has been calculated, the spin axis must be aligned on axis 198 which represents the axis through the chucks of a veneer lathe. As shown in FIG. 2, arm 34 is pivotal about pivot axis 28a of shaft 28. The following description will describe how charger arm 34 is moved to grip log L and move it so that spin axis 192a is aligned in lathe axis 198. It is to be remembered that each arm 34 is operable independently of the other. In order to clarify the following description, reference must also be directed to FIG. 7. As shown in FIG. 2, arm 34 is initially positioned in the pre-spot position. Shaft encoder 50a transmits data to the computer indicating the relative position of reference point 70a along radius arm 197 extending from pivot 28a.

As a first step, actuating means 86 is operated to retract rods 90 so that shoe 70 is positioned adjacent to spin axis 192a. It is preferable to position point 70a as close as possible to spin axis 192a, but close positioning may not be possible because of certain wood conditions providing a poor gripping surface. As shown in FIG. 7, reference point 70a is positioned somewhat away from spin axis 192a. It is to be noted that present charging apparatus are designed so that the distance between pivot axis 28a and axes 135, 198, are the same so that an arc 200 connects the axes. However, in the present case, spin axis 192a is offset from axis 135 and thus, if moved to the same arc, would not be aligned with lathe axis 198. Accordingly, it can be seen that spin axis 192a must be shifted so as to be positioned on lathe axis 198.

After point 70a has been positioned adjacent to spin axis 192a, cylinders 116 are actuated so that rods 120 are retracted for engaging dogs 73 with an end of the log for securely gripping it. Spindles 132 are then retracted and actuating means 86 are operated to extend rod 90 to the right as shown in FIG. 2. Charger arm 34 is then swung to the right. During this movement, it is necessary to readjust axis 192a so that it will be aligned with lathe axis 198. This is accomplished by the aforementioned X and Y axis actuators. Arm 34 is shown in approximately the middle of its swing in FIG. 7, and spin axis 192a must be moved a certain amount in the X and Y directions in order to be positioned on arc 200 for eventual placement aligned with lathe axis 198. The computer has calculated these distances and signals the respective actuators so that the appropriate X and Y axis adjustments are made during swinging movement. Thereupon, spin axis 192a is aligned on lathe axis 198.

The chucks of the lathe then engage the ends of the log and rods 120 are extended to disengage dogs 73 from the log. Charger arm 34 is then pivoted by means of actuating means 86 to the aforementioned prespot position.

From the above description and operation, it can be seen that the present invention provides several distinct advantages. For instance, the scanning system utilizes break beam scanners coupled with a computer for determining a spin axis which will yield optimum amount of veneer. The spin axis is calculated based upon a non-consideration of the innermost points of concave portions of a log so that a cylinder may be defined within the log and partially without. Thus, rather large, though not necessarily full-length sheets of veneer may be peeled from the log which would not be obtainable if the spin axis were calculated based upon a right cylinder lying entirely within the log.

The present invention also provides X and Y actuators for selectively positioning pivotal charger arms so that a log having a predetermined spin axis may be positioned such that the spin axis is aligned accurately within extremely close tolerances on the axis of the chucks of a veneer lathe. For instance, it has been determined that accuracy within 0.005 inches can be obtained with the present invention.

Furthermore, it is to be noted that existing charging apparatus may be readily modified according to the principles of the present invention. For instance, as shown in FIG. 1, beam 38 and tube 42 are illustrated as being separated along their lengths, such separation permitting independent movement of the charger arms. The X axis actuator permits adjustment of actuating means 86. Prior to being modified with the X axis actuator, cylinder 88 could actuate rod 90 only between predetermined positions.

Another advantage of the present invention resides in the use of extendible-retractable and rotatable spindle assemblies 130. A relatively simple construction results in troublefree and precise rotation and extension or retraction of spindle 132 within cylinder 134.

As mentioned previously, the present invention contemplates computing an optimal spin axis based on convex peripheral points of a log's cross-sectional periphery at selected scanning locations. To explain further, as a log is rotated during a scanning sequence, selected beams from the sources and detectors will be interrupted during log rotation which will correspond to tangent lines at the peripheral points which interrupt a beam. During a scanning sequence, it is contemplated that rotation of the log through 360° will generate tangent lines at each selected convex point where a reading is taken. Concave points will not be noted, and from the tangent lines, an irregular polygon is formed to enclose the particular cross-section of the log where readings are taken.

After polygons are formed at the selected cross-sections, for instance at three cross-sections as shown in FIG. 1, it is contemplated that the largest circle which may be included within the confines of each polygon is computed. Thereupon, the largest or maximum circle which will simultaneously fit within all three polygons is computed. Next, a cylindrical axis is computed which will simultaneously intersect the center of the maximum circle as such circle is situated in each formed polygon. The cylindrical axis so computed corresponds to the optimal spin axis, or the axis of the largest cylinder which may fit through all the polygons.

This method may be more clearly understood from a consideration of FIGS. 8-11. Initially considering FIG. 8, there is shown a peripheral cross-section of a log, generally indicated at 202, positioned between a source 204 and a detector 206 for rotation (during a scanning sequence) about a scanner axis 208. It is to be noted that log 202 (at least at the cross-section noted) does not include an unusually large concave portion such as the peripheral section shown in FIGS. 3-3b and 6. The largest depression or concave portion in log 202 is indicated at 202a and corresponds to an irregularity which is typically present in a log.

Assuming that log 202 is positioned in FIG. 8 at the beginning of a scanning sequence, a predetermined reference line extending vertically upward from axis 208 is selected and noted at 210. With the source and detector in operation, it can be seen that a beam 212 will contact convex point 214 on log 202 and will be interrupted. Beam 212, in effect, is a line tangent to convex point 214. Knowing the geometry of the system, i.e., the location of scanner axis 208, the position of source 204 and detector 206, it is possible to reconstruct beam 212 (or the tangent line corresponding thereto) on the periphery of the log section at 214 as shown in FIG. 11. Specifically, as shown in FIG. 11, log 202 is isolated and shown with tangent line 212 drawn tangent to point 214. The purpose of this construction, which is calculated in the computer, will become more apparent as this description continues.

Next, with reference to FIG. 9, it can be seen that log 202 has been rotated, during the scanning sequence, about scanner axis 208 an amount corresponding to 45° in a counterclockwise direction from reference line 210 to a radial line 216. Rotation in increments of 45° is taken for purposes of illustration only, in order that construction of a resulting polygon may be more convenienty illustrated. With the log in the position shown in FIG. 9, it can be seen that convex point 214a interrupts beam 218. As explained previously with reference to beam 212, it can be seen that beam 218 is tangent to convex point 214a. With the geometry of the system known, it is possible to plot a tangent line corresponding to beam 218 on log 202 shown in FIG. 11. Beam 218 is illustrated at the tangent to point 214a in FIG. 11 as shown and is extended to intersect tangent line 212.

As shown in FIG. 10, log 202 has been rotated an additional 45° to a line 220, from its position in FIG. 9, so that a third convex point 214b interrupts a third beam 222. Of course, beam 222 corresponds to a line tangent to point 214b and may be plotted on the peripheral outline of log 202 as shown in FIG. 11.

Thus, it can be seen that as log 202 is rotated through 360° and readings are taken at selected positions of rotation on the log, a plurality of tangent lines may be generated and plotted at their respective peripheral convex points (where a beam is interrupted on the log as shown in FIG. 11. When the tangent lines are joined, the result is an n-sided polygon enclosing the periphery of the log defined by tangent lines to convex points on the log. As shown in FIG. 11, the polygon is eight-sided corresponding to readings taken every 45°, and points 214c-214g represent convex points at which tangent lines are formed in the subsequent readings. Of course, it is to be appreciated that during an actual scanning sequence, significantly more readings, in the order of 24 (as for every 15° of rotation) would be more typical. The sequence as outlined in FIGS. 8-10 and shown in FIG. 11 is for illustrative purposes only.

Examining the polygon formed in FIG. 11, it is to be noted that the present invention next contemplates a method whereby the largest circle is constructed within the n-sided (in this case eight-sided) polygon. The largest circle which may be provided within the polygon may be readily computed using geometry and is illustrated with its center shown at 224. A radius of the circle is indicated at 226. Center 224 would correspond to an optimal spin axis at least for the peripheral outline shown in FIG. 11. Of course, it is to be remembered that scanning will occur at preselected portions along the length of a log and the optimal spin axis will be that spin axis corresponding to the cylindrical axis which will simultaneously intersect the centers of the largest circle which will fit within all of the polygons generated.

Assuming for the moment that center 224 corresponds to the center of the largest circle which will form within all of the polygons, and is located on the cylindrical or spin axis, it can be seen that if the spin axis is loaded within the chucks of a veneer lathe, long strips of veneer will be initially peeled from the log as it is rotated. For instance, it can be seen that long strips of veneer will be peeled when a veneer knife first makes contact with a circumference of the circle indicated at 228. Thus, long strips of veneer, suitable for face material in plywood or composite board, will be provided.

This is to be specifically contrasted with prior art methods which are directed to the concept of providing the largest circle which will fit within the peripheral confines of the log. Such a circle is indicated with its center at 230 and its circumference at 232. It can be seen that if center 230 were aligned in the chucks of a veneer lathe, short strips of veneer would be peeled from log 202 prior to the veneer knife making contact with a circumference of the circle indicated at 232. The small strips are generally not commercially usable, and therefore wastage of materials occurs.

The above example of the peripheral cross-section of a log, as set forth in FIGS. 8-11, has been set forth to show that usable veneer, in the form of significantly long strips may be readily peeled from a typical log having a concave portion such as the log shown in peripheral cross-section at 202.

The above-described "concept of convexity" or the method of computing tangent lines and intersecting them to form an irregular polygon surrounding a peripheral section of a log is an operation which may be readily computed. In addition, having a polygon figure facilitates cmputation of a circle which will lie within that figure because the geometry of a polygon is relatively simple. This may be more readily appreciated when the difficulties of computing a circle lying within an irregular shape, such as the periphery of a log, are encountered. A polygon, generated as described above, by forming tangents to selected points which interrupt a beam, may readily be constructed.

While the present invention has been described with reference to the foregoing preferred embodiment, it will be readily appreciated that other changes and modifications can be made by one having ordinary skill in the art.

What is claimed is:

1. A veneer lathe charging apparatus comprising:
a frame;
a pair of independently operable elongate charger arms, each being pivotally mounted on said frame and including gripping means for gripping the ends of a log, said gripping means being mounted on a rod which is slidably mounted in a guide means provided on each arm;

power-driven means mounted on each of said arms, and power transmission means operably coupled to said power-driven means and said gripping means for selectively extending and retracting said rod relative to said guide means in a direction generally along the longitudinal axis of said arm;

a pair of independently operable actuating means for angularly displacing an associated arm, each of said actuating means being mounted on said frame and shiftable in a substantially horizontal direction.

2. The apparatus of claim 1, wherein additional power-driven means are mounted on said frame adjacent to an associated actuating means, and wherein power transmission means are operatively coupled to said additional power-driven means and said actuating means for selectively shifting an end of said actuating means in a generally horizontal direction.

3. The apparatus of claim 2, wherein each of said power transmission means includes an elongate ball bearing screw mounted in a nut and movable in the direction of its longitudinal axis.

4. The apparatus of claim 3, wherein each of said actuating means is mounted on a slide mechanism, said mechanism being connected to an associated one of said screws and shiftable upon screw movement.

5. An apparatus for scanning the surface configuration of a log and transferring the log so that a predetermined log spin axis is aligned in the chucks of a veneer lathe comprising:

a frame;

rotating means mounted on said frame including a power-driven extendible-retractable spindle for rotating a log about a longitudinal axis;

electro-optical scanning means disposed adjacent to said log and including source means for emitting beams of light across a rotating log to a detector means, said light beams being interrupted during continuous rotation by peripheral points on the log to thereby generate electrical signals indicating distances from said longitudinal axis to the interrupting peripheral points;

computer means for receiving said signals and determining a spin axis based on said distances;

shaft encoder means connected to said spindle for producing electrical signals to said computer means indicating the degree of rotation of said spindle;

a pair of elongate charger arms pivotally connected to said frame including gripping means operable for gripping the ends of the log and transferring it to locate said spin axis in alignment in the chucks of the veneer lathe, said gripping means being mounted on a rod which is slidably mounted in a guide means provided on each arm;

power-driven means mounted on each of said arms and power transmission means operatively coupled to said power-driven means and said gripping means for selectively extending and retracting said rod relative to said guide means in a direction generally along the longitudinal axis of said arm; and actuating means provided for independently angularly displacing an associated arm, each of said actuating means being mounted on said frame and shiftable in a substantially horizontal direction.

6. The apparatus of claim 5, wherein additional power-driven means are mounted on said frame adjacent to an associated actuating means, and wherein power transmission means are operatively coupled to said additional power-driven means and said actuating means for selectively shifting an end of said actuating means in a generally horizontal direction.

7. The apparatus of claim 6, wherein each of said power transmission means includes an elongate ball bearing screw mounted in a nut and movable in the direction of its longitudinal axis.

8. The apparatus of claim 7, wherein each of said actuating means is mounted on a slide mechanism, said mechanism being connected to an associated one of said screws and shiftable upon screw movement.

9. The apparatus of claim 8, wherein each of said power-driven means is provided with an encoder means for generating electrical signals to said computer means indicating the position of its associated power transmission means, said encoder means also being operable to actuate said power-driven means.

* * * * *